3,421,566
FOLDABLE SIDEWALL PNEUMATIC TIRE WITH
CANTED SIDEWALL SUPPORT RIBS
James Sidles, West Richfield, and John F. Heimovics,
Stow, Ohio, assignors to The B. F. Goodrich Company,
New York, N.Y., a corporation of New York
Filed Aug. 8, 1966, Ser. No. 570,856
U.S. Cl. 152—330                                    6 Claims
Int. Cl. B60c 13/00; B60c 19/00

ABSTRACT OF THE DISCLOSURE

A foldable sidewall type pneumatic tire has a series of ribs molded on areas of the folded sidewall portions to more firmly and stably support the tread margins against the underlying beads and thereby augment the run-flat capability of the tire. The ribs extend radially along the sidewall, and in elevation above the sidewall, they are canted in a direction counter to the rotational direction of the tire.

---

This invention relates to pneumatic tires and more particularly to an improved expansible-type pneumatic tire which operates when inflated much like a conventional tire, but which is also capable of operating with unusual rolling stability even when the tire is fully deflated or "flat". This "run-flat" capability makes this improved tire especially suitable for automotive vehicles and for military combat automotive vehicles.

The improved expansible tire of this invention is made with conventional tire-making materials and components. Structurally, the tire includes a pair of laterally spaced annular inextensible beads with an interconnecting flexible annular carcass of elastomer-coated tire ply fabric and an external ground-engaging tread capable of significant elastic expansion in circumference. In the sidewall regions there are flexible folds permanently set by molding these regions when the tire is vulcanized so that each sidewall region is folded on itself axially inside the tread. When the tire is deflated the tread is circumferentially contracted (elastically) toward the beads and the sidewall regions are folded axially inside the tread so that the external diameter and lateral width of the tire is very much smaller when deflated than when it is inflated. For example, a typical passenger car tire of this type may have its outside diameter at the crown of the tread in the order of 30% to 40% smaller when the tire is deflated than when it is inflated, and the lateral width when deflated may be about 10% smaller than when inflated. Accordingly, the total space occupied by a tire-and-wheel assembly of this type is about 50% smaller when the tire is deflated than when inflated.

These tires are normally maintained in their smaller deflated condition on their respective service wheels, and are inflated to their larger operating size only during the periods the wheels are in actual operating or load-carrying service. Owing to the inherent stiffness of the flexible carcass, and the elasticity of the elastomer matrix of the carcass, a tire of this type normally assumes and remains in the collapsed or folded configuration in which it has been molded so long as it is deflated and is otherwise free of externally applied deforming forces. During inflation, the flexible folded portion of the sidewall region is displaced so that it flexibly unfolds, and the carcass portion is elastically expanded by the inflation medium until the tire carcass approaches the characteristic open-bellied toroidal shape of a common pneumatic tire of the prior art. When fully inflated, these tires may look and operate substantially like any prior art tire of corresponding size for the same service. On subsequent deflation, however, the carcass region elastically contracts to collapse the tire to its initial smaller size, with the sidewall region refolding into the original molded configuration.

Although folding tires of this type have been designed primarily for their space-saving advantages in storage, it has been found, prior to this invention, that by supporting the annular margins of the tread firmly on their underlying beads when the tire is deflated and its sidewalls folded, a tire of this type will roll under normal load on its associated wheel with unusually good stability even when flat. With the tread margins properly supported in this manner, the tread remains in good alignment with the wheel rim and concentric with it so that this tire can operate practically like a solid tire if it should be deflated in service by damage or for other causes. In contrast, a conventional pneumatic tire wobbles very unstably on its rim when rolling under load in deflated condition and will be quickly destroyed, unless the tread is supported by independent devices such as rigid or inflatable supports on the wheel rim inside the tire.

To support the tread for deflated rolling operation, the tire of this invention includes a series of slanting tread-supporting ribs which are molded integrally to the outside surface of the tire along at least one of the opposing foldable areas of each sidewall region. These ribs are circumferentially spaced around the sidewall. In their lengthwise direction, preferably the ribs extend axially of the tire when the sidewalls are folded; and they extend radially outward (preferably along the sidewall area which is closest to the bead) when the tire is inflated. In elevation, the ribs are slanted slightly in a direction counter or opposite to the rotational direction of the tire; that is to say the top or outer surface of each rib is circumferentially offset from its base at the tire sidewall so that the top surface "lags" the base portion when the tire rotates.

When the tire is deflated these ribs cooperate to engage the opposing sidewall area of their respective fold and in this way firmly support the overlying annular marginal region of the tread on the bead. The ribs are made wide enough to cushion the tread against cutting on the bead or rim flange and they are preferably spaced sufficiently so that air can pass between the ribs for cooling the tire sidewall when operating in deflated condition. The ribs also allow circumferential movement of tread area relative to the bead area without heat generating therefrom. The special advantage of the slanted ribs is that in the foot print region of the tire, the distortion of the tread tends to compress and deflect the slanted ribs toward a less-slanted, more-radial position, providing columnar support between the beads and the tread in the region of the foot print.

The invention will be further explained with reference to the accompanying drawing which shows, by way of example, one preferred tire for passenger automobiles made according to and embodying this invention. In the drawings.

Figure 1:
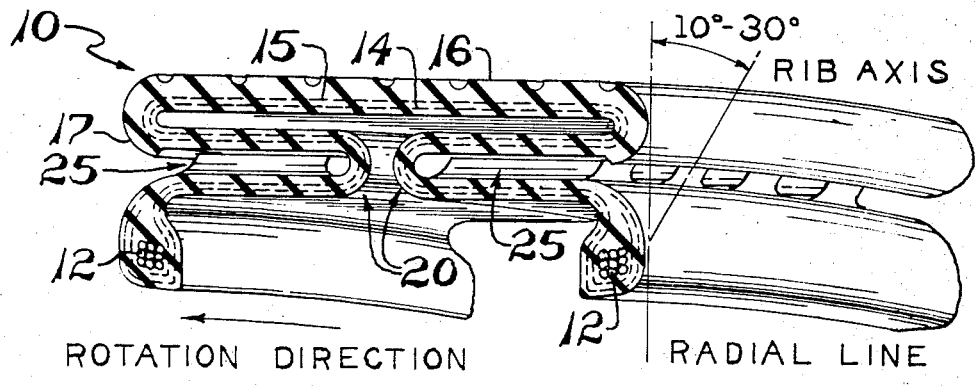
FIG. 1 shows a cross section of the tire with portions of its folded sidewalls and beads shown in perspective.

Referring to the drawing, the tire 10 is mounted on a standard drop-center type automotive rim 11. Structurally, the tire 10 has a pair of annular laterally spaced inextensible beads 12 with a flexible carcass 13 extending between and fastened to each of the beads. The carcass includes two fabric plies 14, 15 and an external ground-engaging tread portion 16.

The foregoing components of the tire are preferably made of conventional tire-making materials. The beads 12 are preferably wire-wound grommets and the plies 14 and 15 are fastened to the beads all in accordance with common industry practice for building passenger car tires. The plies 14 and 15 are preferably conventional tire cord fabrics (wefted or weftless) such as nylon, rayon, or special polyester cords. The elastomeric coatings on the fabrics are likewise conventional tire-making rubber compounds, as is the tread region 16.

Additionally, this tire may be built on conventional passenger tire production machinery. That is to say, the tire may be built in cylindrical form according to the so-called flat band tire-making method. The tire cord material from which the plies 14–15 are made is initially coated with an elastomer and then bias cut and laid with the cord angle of successive plies opposing each other in the usual manner. The resulting cylindrical green tire carcass is then axially compressed into a special mold (not shown) which has a molding surface contour for imparting to the tire a permanent molded configuration substantially as shown in FIGS. 1 and 2.

For passenger car service this tire is preferably molded with a generally "flat" or cylindrical tread portion 16 which has its lateral margins or tread shoulders 17 merging with thinner sidewall regions 18 leading to the beads 12. Each sidewall region 18 is molded so that it has a permanent flexible hairpin-shaped fold 20 extending circumferentially around the tire. That is to say, each sidewall region 18 is folded on itself during the molding operation so that in the deflated condition of the tire, most of the sidewall region between the bead and the tread shoulder extends axially inward and is generally concentric with the tread region 16. The folded regions 20 define in the deflated condition an annular reentrant channel open to the exposed or outside surface of the tire.

Figure 4:
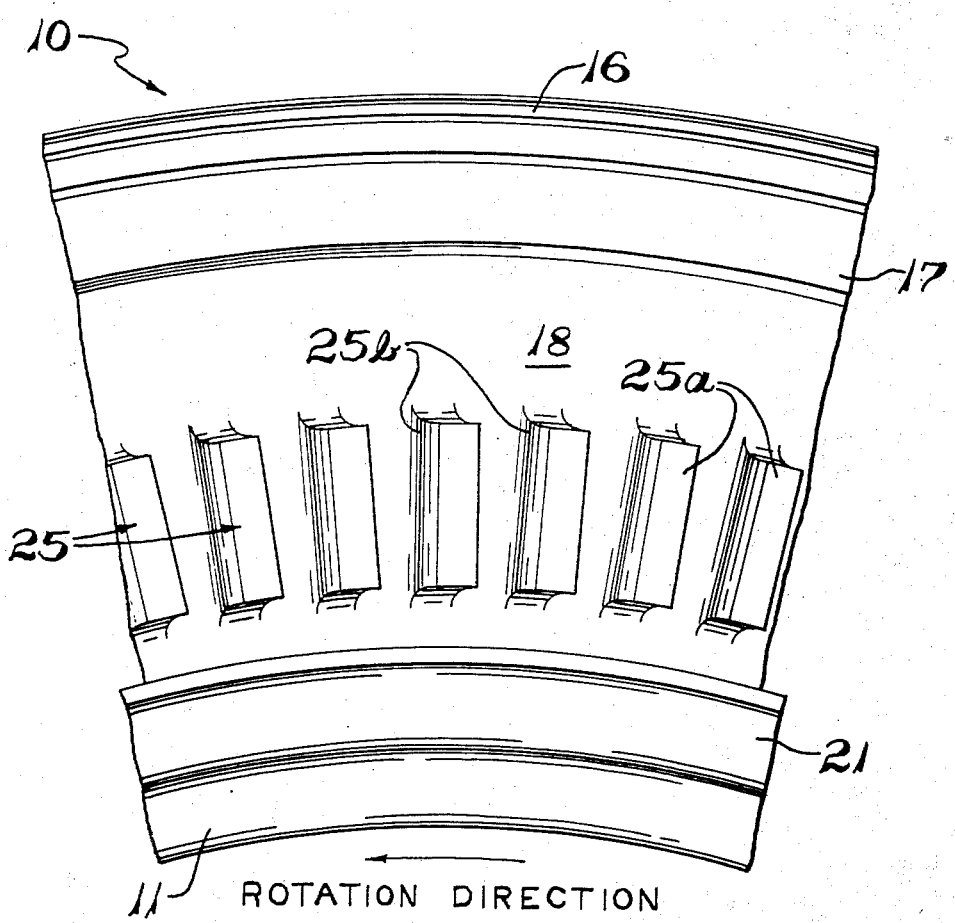
FIG. 4 is a side elevation of a part of the tire showing the position of the tread-supporting ribs when the tire is inflated.
Figure 2:
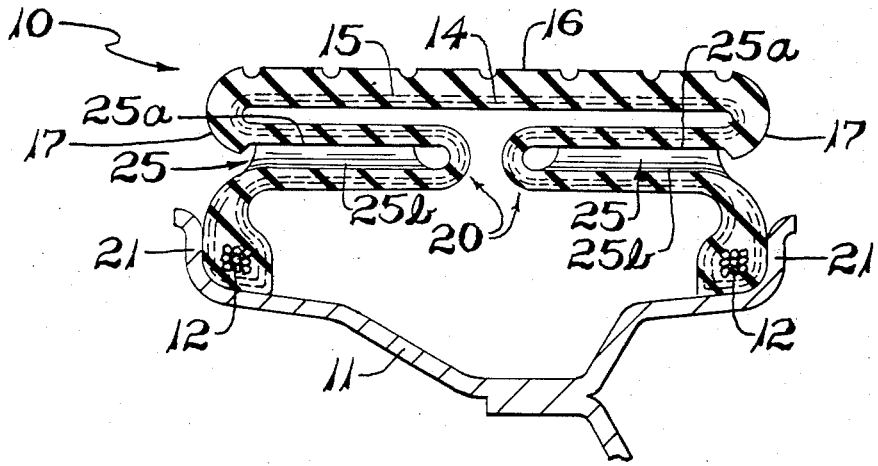
FIG. 2 shows a cross section through a tire and wheel rim assembly with the tire collapsed and folded.

As best shown in FIGS. 1 and 4, the outside surface of each of the foldable sidewall portions 18 adjoining the beads has a series of slanted projections or ribs 25 molded integrally with the sidewall. The ribs 25 are spaced apart circumferentially on the sidewalls. In its lengthwise direction, each rib extends radially of the sidewall from a point close to the bead toward a location where the flexible sidewall is reversely bent. The length of the ribs in this direction (and also the width of the ribs) may vary widely, the main function of the rib being to support the tread shoulder on the bead region.

In the direction of its thickness, each rib is slanted with respect to a radius of the tire at an angle which may range from about 10 degrees to about 30 degrees as indicated in FIG. 1. The slanted direction is counter to the rotational direction of the tire; that is to say the top or outer surface 25a of each rib is circumferentially offset from its base region 25b where the rib is joined to the sidewall so that when the tire is rotated the base portion of each rib is slightly forward or "leads" its top surface. The slant relative to an arrow indicating the rotational direction is as shown in FIG. 1.

The thickness of these ribs 25 is selected such that when the tire is mounted on a rim and collapsed as in FIG. 2, the crests of the ribs are adapted to bear against the opposing folded sidewall are and collectively provide firm cushioned support for the annular margins 17 of the tread on the beads 12. Preferably the tread is supported in a generally cylindrical shape. The ribs are laterally spaced to provide for the passage of cooling air which will reduce or delay heat build up in the tire sidewalls when the tire is run flat or collapsed. When a radial load is exerted on tread 16, it will be apparent that the ribs 25 at least in the footprint area will transmit this load to the beads and rigid wheel, and the ribs will also cushion the tread, tend to minimize cutting of the tread against the beads and rim flange, and will also maintain the tread in alignment with the wheel rim and reasonably concentric with the wheel. The ribs also operate to transmit braking or driving torque from the wheel to the tread by their frictional engagement with the opposing folding area of the sidewall 18.

By slanting the ribs as shown, the ribs are resiliently deformed as they progressively move through the footprint of the tire (when the tire is collapsed and under load) away from their initial slanted positions and toward a more nearly radial position, thereby providing improved columnar support between the footprint portion of the tread and the adjoining bead portion.

The beads 12 of the tire are preferably molded so that they form an interference fit with the adjoining bead seat regions of the wheel rim along the internal surface of the rim flanges 21.

The tire preferably further includes the usual materials and features to enable the tire to operate satisfactorily in tubeless condition. The tire may be inflated or deflated by a standard rim-mounted inflation valve (not shown).

After the tire is initially mounted on its rim 11, preferably it is inflated just enough to wedge the beads 12 tightly against the respective bead seats of the rim. Thereafter with the tire fully deflated, the beads normally tend to remain snugly seated in the bead seats in the manner shown. To assist in maintaining the beads properly seated after a mounted tire is deflated, the tire is preferably molded with the beads 12 spaced laterally a slightly greater distance than the actual distance between the inside surfaces of the rim flanges 21.

Figure 3:
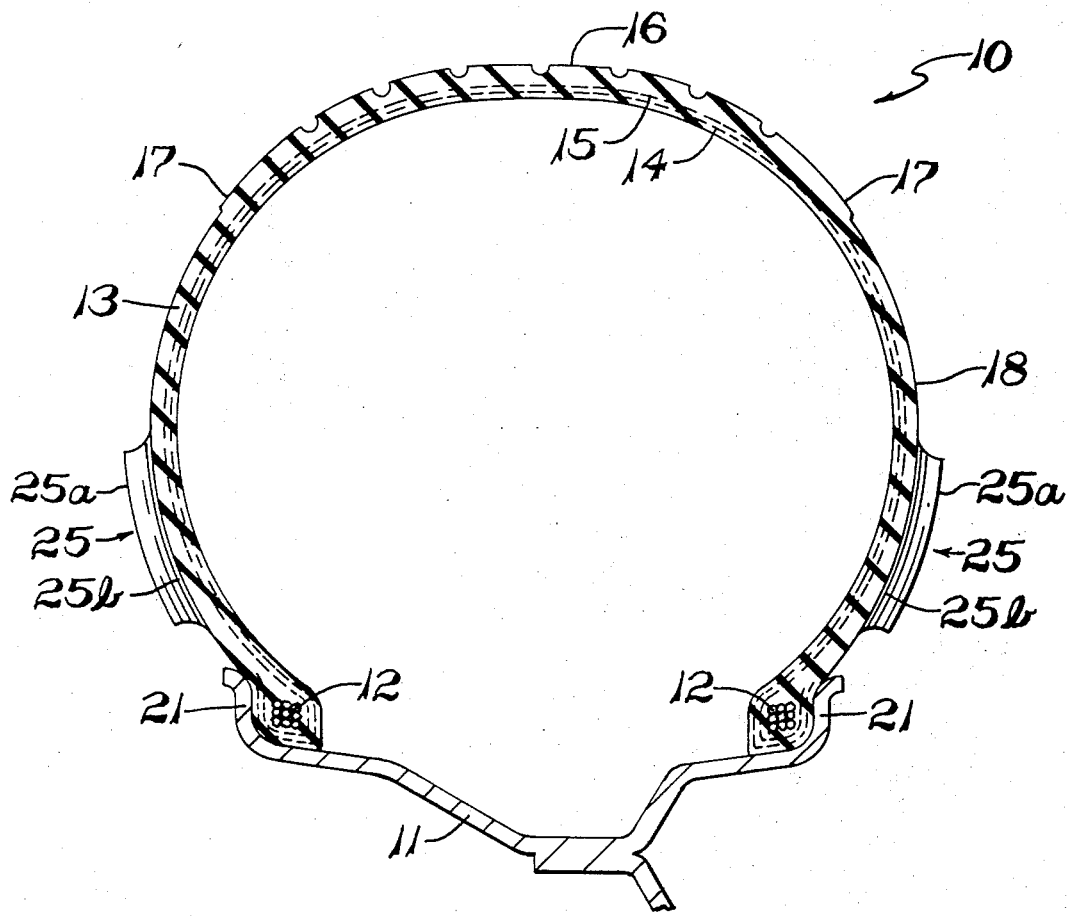
FIG. 3 shows a cross section like FIG. 2 except that the tire is inflated.

To place the resulting tire-and-rim assembly in load-carrying service, any suitable inflation mechanism may be used to inflate the tire. Progressive inflation of the tire stretches the carcass circumferentially in the tread region 16 and progressively unfolds the sidewall regions 18. The apices of the folds, indicated by numerals 20, are displaced laterally away from each other until the tire assumes approximately the generally toroidal shape indicated in FIG. 3. The ribs 25 are merely directed outwardly from the lower region of the sidewalls when the tire is inflated. When fully inflated the tire functions like any other tire of the same class and size. For emergency use in passenger cars, this improved tire may have a significantly thinner tread than would ordinarily be used with a conventional passenger car tire. The thinner tread emergency tire would be operated in load-carrying service only for a period sufficient to enable the main wheel tire to be repaired. By an appropriate selection of the tread dimensions and tread and carcass materials, however, the mileage available for a tire of this class may be varied significantly.

On release of inflation, the elasticity of the carcass portion, including particularly the tread region of the carcass, causes the carcass to return or retract to substantially its original molded shape. During the retraction each sidewall 18–20 automatically refolds to the position shown in solid lines in the drawing, bringing the ribs 25 back into supporting engagement with the opposing sidewall areas under the tread margins.

The carcass portion of this tire is capable of accommodating the unusually great circumferential elongation of the tread region between the deflated and inflated condition by a combination of the elasticity of the elastomer matrix in which the tire cord fabric is molded and by the pantographing action of the tire cords in the plies 14, 15. A typical type passenger car tire made according to this invention may be built up by wrapping elastomeric coated plies of tire cord 14 and 15 about a cylindrical building drum with the cords forming an angle to the circumference of the building drum of about 60 to 65°. At the conclusion of the building stage, the resulting cylindrical green tire casing is then axially compressed and molded substantially to the shape shown in the solid lines in the drawing. The steps of shaping the green carcass and molding it may shift the original cord angle to about 55–60° to the circumference (or the medial center plane) of the tread. This relatively small shift or "pantographing" of the cords during the molding results from the relatively low profile of the tire and it is very much less than the corresponding action of the cords which normally occurs where a similarly built tire is cured in the familiar toroidal form.

A much greater pantographing or cord angle shift occurs, however, in this type tire during its inflation after it is fully cured. The angle of the cords of the plies 14 and 15 of the tire noted in this example may shift from about 55–60° when the cured tire is in deflated condition, to about 35–45° when the tire is fully inflated. In each case the angle noted is measured from the medial circumference or medial center line of the tire tread. The elastic character of the elastomer matrix in which the cords are molded permits such a radical pantographing action of the cords between the inflated and deflated condition. The tire cords themselves in this tire are not intended to and do not themselves appreciably elongate during the elastic expansion of the tire carcass as it is inflated. The remarks in the foregoing description about the expansion of the tire carcass are intended to refer to an expansion involving a shifting or pantographing action of the tire cords. A tire carcass does not stretch uniformly in all directions when inflated like a homogeneous wall pressure vessel such as a simple balloon.

The foregoing angular ranges have been cited merely to illustrate the order of magnitude of the changes in cord angle which occurs in one specific size passenger car tire from the time the carcass plies are laid up on the cylindrical building drum to the time the tire is fully inflated. The actual selection of cord angles in making these tires will follow conventional practice and will depend primarily on the ultimate shape desired for the tire cross section after it is fully inflated and also on the intended service for the tire. In aircraft tires, for example, the cord angles of the several plies may undergo even greater proportional change than those described in the foregoing example.

The cord angle shifting effect which occurs in this type tire also occurs in other common pneumatic tires. There is a much greater shift in this type tire, however, during its inflation than ordinarily would occur in common tires.

The folds in the sidewall regions 18 of the illustrated tire are in substantial axial alignment with each other. Each extends almost to the medial circumferential center line of the tread region 16. The axial depth of each fold 20 may be varied depending on the size and shape desired for the inflated configuration of the tire. If the folds are more shallow than those illustrated, the radial width of the inflated tire would be correspondingly reduced. On the other hand, the radial width of the tire in its inflated condition may be significantly increased by forming the folds 20 of deeper or greater axial extent than those shown and making the folds so that one concentrically overlaps the other.

For aircraft, truck or other heavy-duty service, a tire according to this invention may be made with a great many more plies than the two shown in the drawing, and ordinarily such tires would have a much thicker tread region. Such tires may additionally include other special structural details such as fabric reinforcements of the tread. In any case, however, such tires may be made with at least one permanent inwardly folded region in the sidewall portion of the carcass in accordance with the principles of this invention.

It is to be understood that the ribs 25 are intended to support the tread for rolling operation in a collapsed condition on primarily an emergency basis. Such operation is not recommended for continuing long service operations. We have found that it is possible to operate tires of this type in collapsed condition on passenger cars for one hundred miles at speeds up to thirty miles per hour which clearly demonstrates its emergency capabilities. With slower speed operation, the collapsed tire would operate for much additional distance. Prolonged high speed operation of these tires causes heat deterioration as is ordinary with solid tires.

What is claimed is:

1. A pneumatic tire inflatable to a generally toroidal shape, the tire comprising a pair of laterally spaced annular beads and an annular flexible carcass of elastomer-coated fabric with a circumferential tread region and opposing sidewall regions between said tread region and each bead, at least one sidewall region having a flexible fold permanently set in the sidewall region, the fold extending circumferentially of the carcass in a continuous reentrant channel open to the outside surface of the sidewall in the deflated condition of the tire and adapted to unfold and assume a generally toroidal shape when the tire is inflated, and resilient projections on the outside surface of said folded sidewall region slanted relative to a radius of the tire for engaging and supporting the margin of the tread region against the underlying bead when said tire is deflated.

2. A tire according to claim 1 wherein said projections are slanted in elevation in a direction counter to the rotational direction of the tire.

3. A tire according to claim 2 wherein said projections are a series of radially extending slanted ribs on one of the opposing folded portions of said sidewall region.

4. A pneumatic tire comprising laterally spaced beads, and a carcass of elastomer-covered fabric which includes a ground-engaging external tread region and opposing flexible sidewall regions between the tread and the bead, each sidewall region having a flexible fold permanently set in the sidewall region, each fold including a reversely bent portion and two opposing folded sidewall areas, one area extending from said reversely bent portion to the margin of said tread portion, and the other extending to the adjoining bead, thereby forming a continuous reentrant channel open to the outside surface of the carcass and underlying said tread region and a series of ribs disposed radially of one of said folded sidewall areas, said ribs in elevation slanting in a direction counter to the rotational direction of the tire for engaging and supporting the margins of the tread region against the underlying bead when said tire is deflated.

5. A pneumatic tire of the type which is inflatable to a generally toroidal shape and which comprises a pair of laterally spaced annular beads and an annular flexible elastically distensible carcass of load-carrying elastomer-coated fabric plies with a circumferential tread region and opposing flexible sidewall regions between said tread region and each bead, at least one sidewall region having a flexible fold permanently set in the sidewall region, the fold extending circumferentially of the carcass in a continuous reentrant channel open to the outside surface of the sidewall in the deflated condition of the tire with the apex of the sidewall fold having a diameter about the same size as the bead diameter, said carcass being adapted to distend and said sidewall being adapted to unfold to assume a generally toroidal shape when the tire is inflated, and characterized in that the outside surface of said folded sidewall includes a series of resilient projections which are slanted in elevation away from a radius of the tire for engaging and supporting the margin of the tread region against the underlying bead when said tire is deflated.

6. A pneumatic tire according to claim 5 and further characterized in that said projections are slanted in a direction counter to the normal rotational direction of the tire.

(References on following page)

References Cited

UNITED STATES PATENTS

| | | | |
|---|---|---|---|
| 2,751,959 | 6/1956 | Blomquest | 152—416 |
| 3,052,429 | 9/1962 | Simon | 152—330 X |
| 3,116,778 | 1/1964 | Herzegh et al. | 152—330 |

ARTHUR L. LA POINT, *Primary Examiner.*

C. B. LYON, *Assistant Examiner.*

U.S. Cl. X.R.

152—352